(12) United States Patent
Perry et al.

(10) Patent No.: US 7,776,967 B2
(45) Date of Patent: *Aug. 17, 2010

(54) POLYORGANOSILOXANE COMPOSITION FOR USE IN UNSATURATED ELASTOMER, ARTICLE MADE THEREFROM, AND ASSOCIATED METHOD

(75) Inventors: Robert James Perry, Niskayuna, NY (US); Michael Joseph O'Brien, Clifton Park, NY (US); Isabel Christin Albers, Hannover (DE); Carla Recker, Hannover (DE); William Michael York, Concord, NC (US)

(73) Assignee: Continental AG, Hannover (DE)

( * ) Notice: Subject to any disclaimer, the term of this patent is extended or adjusted under 35 U.S.C. 154(b) by 1092 days.

This patent is subject to a terminal disclaimer.

(21) Appl. No.: 11/305,473

(22) Filed: Dec. 16, 2005

(65) Prior Publication Data
US 2007/0142553 A1 Jun. 21, 2007

(51) Int. Cl.
*C08L 47/00* (2006.01)
*C08G 77/28* (2006.01)

(52) U.S. Cl. .......... 525/105; 525/100; 528/26; 528/30; 524/424; 524/506

(58) Field of Classification Search .......... 525/100, 525/105; 524/424, 506; 528/30
See application file for complete search history.

(56) References Cited

U.S. PATENT DOCUMENTS

| | | | |
|---|---|---|---|
| 2,802,853 A | 8/1957 | George et al. | |
| 3,445,496 A | 5/1969 | Ryan et al. | |
| 3,692,812 A | 9/1972 | Berger | |
| 6,031,060 A | 2/2000 | Letchford et al. | |
| 6,127,468 A | 10/2000 | Cruse et al. | |
| 6,140,393 A | 10/2000 | Bomal et al. | |
| 6,172,157 B1 | 1/2001 | Araki et al. | |
| 6,204,339 B1 | 3/2001 | Waldman et al. | |
| 6,245,834 B1 | 6/2001 | Bomal et al. | |
| 6,271,331 B1 | 8/2001 | Gay et al. | |
| 6,331,605 B1 * | 12/2001 | Luginsland et al. | 528/30 |
| 6,414,061 B1 | 7/2002 | Cruse et al. | |
| 6,472,481 B1 | 10/2002 | Luginsland et al. | |
| 6,608,125 B2 | 8/2003 | Cruse et al. | |
| 6,683,135 B2 | 1/2004 | Cruse et al. | |
| 6,777,569 B1 | 8/2004 | Westmeyer et al. | |
| 6,878,768 B2 | 4/2005 | Tardivat et al. | |
| 7,169,872 B2 | 1/2007 | Cruse | |
| 7,301,042 B2 * | 11/2007 | Cruse | 556/429 |
| 7,560,513 B2 | 7/2009 | Silvi et al. | |
| 2003/0130388 A1 | 7/2003 | Luginsland et al. | |
| 2003/0199619 A1 | 10/2003 | Cruse | |
| 2005/0009955 A1 | 1/2005 | Cohen | |
| 2005/0090680 A1 | 4/2005 | Belin et al. | |

* cited by examiner

*Primary Examiner*—Margaret G Moore
(74) *Attorney, Agent, or Firm*—Greenblum & Bernstein P.L.C.

(57) ABSTRACT

A tire composition is provided that may include a sulfur-functional linear polyorganosiloxane and an unsaturated elastomer. The sulfur-functional linear polyorganosiloxane may include a chemically protected sulfur group, which includes a thiocarbamate, a dithiocarbamate, or a derivative or analog of thiocarbamate or dithiocarbamate. Under certain conditions, the sulfur group may react with the unsaturated elastomer. The invention includes embodiments that may relate to methods of making and using the sulfur-functional linear polyorganosiloxane in tire compositions.

32 Claims, No Drawings

POLYORGANOSILOXANE COMPOSITION FOR USE IN UNSATURATED ELASTOMER, ARTICLE MADE THEREFROM, AND ASSOCIATED METHOD

Under 35 U.S.C. §103(c)(2)(C), the following identifies parties to one or more joint research agreements: General Electric Company and Continental AG.

BACKGROUND

1. Technical Field

The invention may include embodiments that relate to a tire composition including a sulfur-functional linear polyorganosiloxane having chemically-protected sulfur groups. The invention may also include embodiments that relate to a method of making and using the sulfur-functional linear polyorganosiloxane in tire compositions.

2. Discussion of Related Art

Natural or synthetic rubbers (or elastomers) in their unvulcanized state may have inherently low mechanical properties that may prevent them from being used in applications requiring high tensile strength. The elastomer may need to be chemically crosslinked (vulcanized) to maximize the modulus and tensile properties. Elemental sulfur may be used as a "primary" crosslinking agent to vulcanize natural or synthetic rubbers.

Additional crosslinking agents such as mercaptosilanes may also be used to provide secondary crosslinking with the elastomer. The mercaptosilanes may also be used as compatibilizers for rubber compositions comprising reinforcing fillers. However, mercaptosilanes may have high chemical activity and may prematurely cure with the elastomer (scorch) during compounding of the rubber formulations. This scorching reaction may cause undesirable increase in viscosity and less than desirable filler dispersion resulting in poor processability and low reinforcing action.

It may be desirable to have sulfur-containing secondary crosslinking agents that may not prematurely cure with the elastomer and may also function as compatibilizers for fillers, when so desired. It may be desirable to have vulcanized rubber compositions with properties other than those currently available for varied applications.

BRIEF DESCRIPTION

In one embodiment, a tire composition may be provided that includes an unsaturated elastomer and a sulfur-functional linear polyorganosiloxane. The sulfur-functional linear polyorganosiloxane may include a chemically-protected sulfur group capable of reacting with the unsaturated elastomer, and the chemically-protected sulfur group may include thiocarbamate, dithiocarbamate, or a derivative or analog of thiocarbamate or dithiocarbamate.

In one embodiment, a method for producing a tire composition may include producing the sulfur-functional linear polyorganosiloxane. The sulfur-functional linear polyorganosiloxane may include a chemically protected sulfur group that may include a thiocarbamate, dithiocarbamate, or a derivative or analog of thiocarbamate or dithiocarbamate. Reacting a linear polyorganosiloxane that may include an alkene group with a thioacid may produce the sulfur-functional linear polyorganosiloxane.

One embodiment may provide a tire formed from a composition including a reaction product of a linear polyorganosiloxane and a thio acid. The reaction product may include a thiocarbamate, dithiocarbamate, or a derivative or analog of thiocarbamate or dithiocarbamate. The linear polyorganosiloxane may include an alkene group. The thio acid may have a structure defined by formula (IV):

$$((R^{27}OC(=O))_{t}\text{-}(L)_{j})_{k}\text{-}(Q)_{z}J(=E)SH \tag{IV}$$

wherein $R^{27}$ is an aliphatic radical, a cycloaliphatic radical, or an aromatic radical; L is independently at each occurrence a monovalent group or a polyvalent group that is derived by substitution of an aliphatic radical, a cycloaliphatic radical, or an aromatic radical; Q is oxygen, sulfur, or an $NR^{29}$ group, wherein $R^{29}$ is an aliphatic radical, a cycloaliphatic radical, or an aromatic radical; J is carbon, sulfur, phosphorus, or a sulfonyl group; E is oxygen or sulfur; S comprises one or more sulfur atoms; "t" is an integer that is equal to 0, 1, 2, 3, 4, or 5; "j" is equal to 0 or 1, "k" is equal to 1 if J is carbon, sulfur or sulfonyl, "k" is 2 if J is phosphorus, and "z" is equal to 0, 1, or 2.

DETAILED DESCRIPTION

The invention may include embodiments that relate to a tire composition that may include a sulfur-functional linear polyorganosiloxane and an unsaturated elastomer. The sulfur-functional linear polyorganosiloxane may include a chemically protected sulfur group, which includes a thiocarbamate, a dithiocarbamate, or a derivative or analog of thiocarbamate or dithiocarbamate. Under certain conditions, the sulfur group may react with the unsaturated elastomer. The invention includes embodiments that may relate to methods of making and using the sulfur-functional linear polyorganosiloxane in tire compositions.

In the following specification and the claims which follow, reference will be made to a number of terms having the following meanings. The singular forms "a", "an" and "the" include plural referents unless the context clearly dictates otherwise. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Similarly, "free" may be used in combination with a term, and may include an insubstantial number, or trace amounts, while still being considered free of the modified term. "Linear" is exclusive of branches in the modified term.

A composition according to an embodiment may include a sulfur-functional linear polyorganosiloxane. A sulfur-functional linear polyorganosiloxane may include organosiloxane repeat units linked together in a linear fashion, and without a crosslinked or branched structure. The sulfur-functional linear polyorganosiloxane may include one or more chemically-protected sulfur groups. In one embodiment, the chemically-protected sulfur group may be present at one terminal end of the linear polyorganosiloxane. In one embodiment, the chemically-protected sulfur groups may be present at both terminal ends of the linear polyorganosiloxane. In one embodiment, the chemically-protected sulfur group of the linear polyorganosiloxane may be present as one or more pendent groups off of the linear polyorganosiloxane backbone.

Suitable chemically-protected sulfur groups may include one or more sulfur atoms protected (that is, reversibly blocked) by a functional group. The functional group may render the sulfur atom, or atoms, chemically latent. The chemically-protected sulfur group may be in a state of relatively reduced activity until such a time as the chemically-protected sulfur group is unblocked, unprotected, or activated. Upon activation, the activated sulfur group may chemically react with another organic moiety. Such reaction may include, for example, cross-linking to an unsaturated elastomer.

In one embodiment, the composition may include a functional group that may couple with a filler surface. Coupling of the composition with the filler surface may occur via physical or weak coupling (for example, by formation of hydrogen bonds between the composition and the filler surface) or via chemical coupling (for example, by forming a covalent chemical bond between the composition and the filler surface).

In one embodiment, the composition may have a structure of formula (I), (II), or (III);

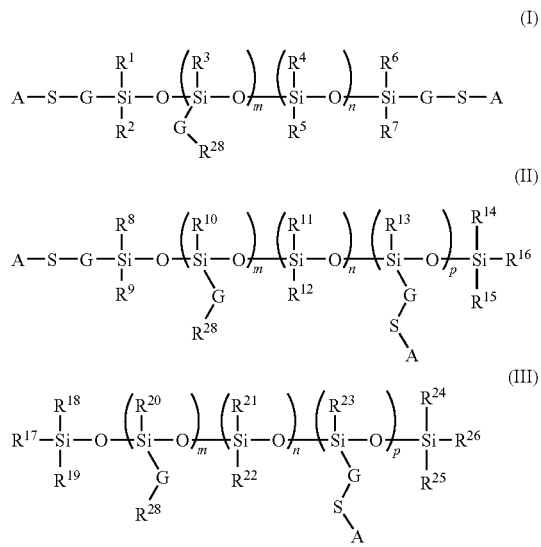

wherein A is a polyvalent radical $((R^{27}OC(=O))_t-(L)_j)_k-(Q)_zJ(=E)$;

$R^1$-$R^{27}$ are independently at each occurrence a hydrogen atom, an aliphatic radical, a cycloaliphatic radical, or an aromatic radical;

G is a bond, a divalent aliphatic radical, a divalent cycloaliphatic radical, or a divalent aromatic radical;

$R^{28}$ is a hydroxyl group, a halogen, a silyl alkoxy group, an alkoxy group, or an aryloxy group;

S is one or more sulfur atoms;

L is independently at each occurrence a monovalent or a polyvalent group derived by substitution of an aliphatic radical, a cycloaliphatic radical, or an aromatic radical;

Q is oxygen, sulfur or an $NR^{29}$ group, $R^{29}$ is an aliphatic radical, a cycloaliphatic radical, or an aromatic radical;

J is carbon, sulfur, phosphorus, or a sulfonyl group;

E is oxygen or sulfur;

"m" and "n" are independently equal to 0 or are an integer greater than 0; "p" is greater than 0; "t" is an integer that is equal to 0, 1, 2, 3, 4, or 5; "j" is equal to 0 or 1; "k" is equal to 1 if J is carbon, sulfur or sulfonyl, "k" is 2 if J is phosphorus; and "z" is an integer that is equal to 0, 1, or 2.

Aliphatic radical, cycloaliphatic radical and aromatic radical may be defined as the following: Aliphatic radical may be an organic radical having at least one carbon atom, a valence of at least one and may be a linear array of atoms. Aliphatic radicals may include heteroatoms such as nitrogen, sulfur, silicon, selenium and oxygen or may be composed exclusively of carbon and hydrogen. Aliphatic radical may include a wide range of functional groups such as alkyl groups, alkenyl groups, alkynyl groups, halo alkyl groups, conjugated dienyl groups, alcohol groups, ether groups, aldehyde groups, ketone groups, carboxylic acid groups, acyl groups (for example, carboxylic acid derivatives such as esters and amides), amine groups, nitro groups and the like. For example, the 4-methylpent-1-yl radical may be a $C_6$ aliphatic radical comprising a methyl group, the methyl group being a functional group, which may be an alkyl group. Similarly, the 4-nitrobut-1-yl group may be a $C_4$ aliphatic radical comprising a nitro group, the nitro group being a functional group. An aliphatic radical may be a haloalkyl group that may include one or more halogen atoms, which may be the same or different. Halogen atoms include, for example; fluorine, chlorine, bromine, and iodine. Aliphatic radicals having one or more halogen atoms may include the alkyl halides: trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —$CH_2CHBrCH_2$—), and the like. Further examples of aliphatic radicals may include allyl, aminocarbonyl (—$CONH_2$), carbonyl, dicyanoisopropylidene —$CH_2C(CN)_2CH_2$—), methyl (—$CH_3$), methylene (—$CH_2$—), ethyl, ethylene, formyl (—CHO), hexyl, hexamethylene, hydroxymethyl (—$CH_2OH$), mercaptomethyl (—$CH_2SH$), methylthio (—$SCH_3$), methylthiomethyl (—$CH_2SCH_3$), methoxy, methoxycarbonyl ($CH_3OCO$—) nitromethyl (—$CH_2NO_2$), thiocarbonyl, trimethylsilyl (($CH_3)_3Si$—), t-butyldimethylsilyl, trimethoxysilylpropyl (($CH_3O)_3SiCH_2CH_2CH_2$—), vinyl, vinylidene, and the like. By way of further example, a "$C_1$-$C_{30}$ aliphatic radical" contains at least one but no more than 30 carbon atoms. A methyl group ($CH_3$—) may be an example of a $C_1$ aliphatic radical. A decyl group ($CH_3(CH_2)_9$—) may be an example of a $C_{10}$ aliphatic radical.

A cycloaliphatic radical may be a radical having a valence of at least one, and having an array of atoms, which may be cyclic but which may not be aromatic. A cycloaliphatic radical may include one or more non-cyclic components. For example, a cyclohexylmethyl group ($C_6H_{11}CH_2$—) may be a cycloaliphatic radical, which may include a cyclohexyl ring (the array of atoms, which may be cyclic but which may not be aromatic) and a methylene group (the noncyclic component). The cycloaliphatic radical may include heteroatoms such as nitrogen, sulfur, selenium, silicon and oxygen, or may be composed exclusively of carbon and hydrogen. A cycloaliphatic radical may include one or more functional groups, such as alkyl groups, alkenyl groups, alkynyl groups, halo alkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups and the like. For example, the 4-methylcyclopent-1-yl radical may be a $C_6$ cycloaliphatic radical comprising a methyl group, the methyl group being a functional group, which may be an alkyl group. Similarly, the 2-nitrocyclobut-1-yl radical may be a $C_4$ cycloaliphatic radical comprising a nitro group, the nitro group being a functional group. A cycloaliphatic radical may include one or more halogen atoms, which may be the same or different. Halogen atoms include, for example, fluorine, chlorine, bromine, and iodine. Cycloaliphatic radicals having one or more halogen atoms may include 2-trifluoromethylcyclohex-1-yl; 4-bromo difluoro methyl cyclo oct-1-yl; 2-chloro difluoro methyl cyclo hex-1-yl; hexafluoro isopropylidene 2,2-bis(cyclo hex-4-yl) (—$C_6H_{10}C(CF_3)_2$ $C_6H_{10}$—); 2-chloro methyl cyclo hex-1-yl; 3-difluoro methylene cyclo hex-1-yl; 4-trichloro methyl cyclo hex-1-yl oxy; 4-bromo dichloro methyl cyclo hex-1-yl thio; 2-bromo ethyl cyclo hex-1-yl; 2-bromo propyl cyclo hex-1-yl oxy (e.g. $CH_3CHBrCH_2C_6H_{10}$—); and the like. Further examples of cycloaliphatic radicals may include 4-allyl oxy cyclo hex-1-yl; 4-amino cyclo hex-1-yl ($H_2C_6H_{10}$—), 4-aminocarbonylcyclopent-1-yl ($NH_2COC_5H_8$—), 4-acetyloxycyclohex-1-yl, 2,2-dicyanoisopropylidenebis(cyclohex-4-yloxy) (—$OC_6H_{10}C(CN)_2C_6H_{10}O$—), 3-methylcyclohex-1-yl, methylenebis(cyclohex-4-yloxy) (—$OC_6H_{10}CH_2C_6H_{10}O$—), 1-ethylcyclobut-1-yl, cyclopropylethenyl, 3-formyl-2-terahydrofuranyl, 2-hexyl-5-tetrahydrofuranyl; hexamethylene-1,6-bis(cyclohex-4-yloxy) (—$OC_6H_{10}(CH_2)_6C_6H_{10}O$—); 4-hydroxymethylcyclohex-1-yl (4-$HOCH_2C_6H_{10}$—), 4-mercaptomethylcyclohex-1-yl (4-$HSCH_2C_6H_{10}$—), 4-methylthiocyclohex-1-yl (4-$CH_3SC_6H_{10}$—), 4-methoxycyclohex-1-yl, 2-methoxycarbonylcyclohex-1-yloxy (2-$CH_3OCOC_6H_{10}O$—), 4-nitromethylcyclohex-1-yl ($NO_2CH_2C_6H_{10}$—), 3-trimethylsilylcyclohex-1-yl, 2-t-butyldimethylsilylcyclopent-1-yl, 4-trimethoxysilylethylcyclohex-1-yl (e.g. $(CH_3O)_3SiCH_2CH_2C_6H_{10}$—), 4-vinylcyclohexen-1-yl, vinylidenebis (cyclohexyl), and the like. The term "a $C_3$-$C_{30}$ cycloaliphatic radical" may include cycloaliphatic radicals containing at least three but no more than 10 carbon atoms. The cycloaliphatic radical 2-tetrahydrofuranyl ($C_4H_7O$—) represents a $C_4$ cycloaliphatic radical. The cyclohexylmethyl radical ($C_6H_{11}CH_2$—) represents a $C_7$ cycloaliphatic radical.

An aromatic radical may be an array of atoms having a valence of at least one and having at least one aromatic group. This may include heteroatoms such as nitrogen, sulfur, selenium, silicon and oxygen, or may be composed exclusively of carbon and hydrogen. Suitable aromatic radicals may include phenyl, pyridyl, furanyl, thienyl, naphthyl, phenylene, and biphenyl radicals. The aromatic group may be a cyclic structure having 4n+2 "delocalized" electrons where "n" may be an integer equal to 1 or greater, as illustrated by phenyl groups (n=1), thienyl groups (n=1), furanyl groups (n=1), naphthyl groups (n=2), azulenyl groups (n=2), anthracenyl groups (n=3) and the like. The aromatic radical also may include non-aromatic components. For example, a benzyl group may be an aromatic radical, which may include a phenyl ring (the aromatic group) and a methylene group (the non-aromatic component). Similarly a tetrahydronaphthyl radical may be an aromatic radical comprising an aromatic group ($C_6H_3$) fused to a non-aromatic component —$(CH_2)_4$—. An aromatic radical may include one or more functional groups, such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical may be a $C_7$ aromatic radical comprising a methyl group, the methyl group being a functional group, which may be an alkyl group. Similarly, the 2-nitrophenyl group may be a $C_6$ aromatic radical comprising a nitro group, the nitro group being a functional group. Aromatic radicals include halogenated aromatic radicals such as trifluoromethylphenyl, hexafluoroisopropylidenebis(4-phen-1-yloxy) (—OPhC$(CF_3)_2$PhO—); chloromethylphenyl; 3-trifluorovinyl-2-thienyl; 3-trichloromethylphen-1-yl (3-$CCl_3Ph$-); 4-(3-bromoprop-1-yl)phen-1-yl ($BrCH_2CH_2CH_2Ph$-); and the like. Further examples of aromatic radicals may include 4-allyloxyphen-1-oxy; 4-aminophen-1-yl ($H_2NPh$-); 3-aminocarbonylphen-1-yl ($NH_2COPh$-); 4-benzoylphen-1-yl; dicyano isopropylidene bis(4-phen-1-yloxy) (—OPhC$(CN)_2$PhO—); 3-methylphen-1-yl, methylene bis(phen-4-yloxy) (—OPhCH$_2$PhO—), 2-ethylphen-1-yl, phenylethenyl, 3-formyl-2-thienyl, 2-hexyl-5-furanyl; hexamethylene-1,6-bis(phen-4-yloxy) (—OPh$(CH_2)_6$PhO—); 4-hydroxymethyl phen-1-yl (4-$HOCH_2Ph$-); 4-mercapto methyl phen-1-yl (4-$HSCH_2Ph$-); 4-methyl thiophen-1-yl (4-$CH_3SPh$-); 3-methoxy phen-1-yl; 2-methoxy carbonyl phen-1-yloxy (e.g., methyl salicyl), 2-nitro methyl phen-1-yl (-PhCH$_2NO_2$); 3-trimethyl silyl phen-1-yl; 4-t-butyl dimethyl silyl phenl-1-yl; 4-vinyl phen-1-yl; vinylidene bis (phenyl); and the like. The term "a $C_3$-$C_{30}$ aromatic radical" may include aromatic radicals containing from three to 30 carbon atoms. A suitable $C_3$ aromatic radical may include 1-imidazolyl ($C_3H_2N_2$—). The benzyl radical ($C_7H_7$—) represents a $C_7$ aromatic radical.

In structures (I), (II) or (III), the substructure "A-S—" may indicate the chemically-protected sulfur group. Wherein, "A" may be a polyvalent radical, $((R^{27}OC(=O))_t\text{-}(L)_j)_k\text{-}(Q)_z$J (=E); defined hereinabove. On one side the group "J" (attached to the unsaturated heteroatom "E") may attach to group $((R^{27}OC(=O))_t\text{-}(L)_j)_k\text{-}(Q)_z$"; and on the other side the group "J" may attach to a sulfur atom, which may link to a silicon atom via a group G.

Suitable chemically protected sulfur groups may include single sulfur atoms, or may include a plurality of sulfur atoms. The plurality of sulfur atoms may form a sulfur chain. In one embodiment, the chemically protected sulfur group may include one or more of a thiocarboxylate ester (—C(=O)S—); dithiocarboxylate (—C(=S)S—); thiocarbonate ester (—O—C(=O)S—); dithiocarbonate ester (—S—C(=O)S— or —O—C(=S)S—); trithiocarbonate ester (—S—C(=S)S—); thiosulfonate ester, (—S(=O)$_2$S—); thiosulfate ester (—O—S(=O)$_2$S—); thiosulfamate ester; thiosulfinate ester (—S(=O)S—); thiosulfite ester (—S(=O)S—); thiosulfimate ester; thiophosphate ester (P(=O)(O—)$_2$(S—)); dithiophosphate ester (P(=O)(O—)(S—)$_2$ or P(=S)(O—)$_2$(S—)); trithiophosphate ester (P(=O)(S—)$_3$ or P(=S)(O—)(S—)$_2$); tetrathiophosphate ester (P(=S)(S—)$_3$); thiophosphamate ester; dithiophosphamate ester; thiophosphoramidate ester; dithiophosphoramidate ester; or trithiophosphoramidate ester.

Another suitable chemically protected sulfur group may include a thiocarboxylate ester (—C(=O)S—). In one embodiment, the thiocarboxylate ester may include one or more of methyl or octyl radical and the chemically protected sulfur group may include one or more of thio-acetate group or thio-octanoate group. Yet another suitable chemically protected sulfur group may include a thiocarbamate or a dithiocarbamate.

As noted hereinabove, the chemically-protected sulfur group may connect to a terminal end of a linear polyorganosiloxane. A terminally-connected and chemically-protected sulfur group may be present at a single end, as shown in structure (II); or, may be present at both chain ends of the linear polyorganosiloxane, as shown in structure (I). Single chemically-protected sulfur group may be present as capping agents; or, if other reactive groups also are present, the chemically-protected sulfur group may cross-link indirectly during vulcanization. In one embodiment, the chemically-protected sulfur group may be pendent to the main chain of the linear polyorganosiloxane, as shown in structures (II) and (III). In structures (I), (II), and (III), two or more of the chemically protected sulfur groups may be the same as each other or may differ from each other from embodiment to embodiment.

The activation rate and/or the reaction rate may be controlled by selection of the type, the total number of, and/or ratio of chemically-protected sulfur groups of the composition. For example, the composition may be formed to include both a thio acetate functional group and a thio octanoate functional group. The total number of groups, the type of groups, and the ratio of groups to each other may modulate the rate of activation and subsequent reaction with an elastomer.

Optional surface coupling groups may be included in the composition. In structures (I), (II) or (II), "$R^{28}$" indicates a functional group that may couple to a corresponding reactive group on a filler surface. In one embodiment, the functional group "$R^{28}$" may be hydrolyzable. During a reaction, such a hydrolyzable group may couple with a reactive group of an inorganic filler surface, for example, a silanol group on a silica particle surface. The coupling of "$R^{28}$" with the silanol may form one or both of a physical bond or a chemical bond.

Groups suitable as "$R^{28}$" coupling groups may include one or more of a $C_1$-$C_{20}$ alkoxy radical. In one embodiment, "$R^{28}$" may include a methoxy radical, an ethoxy radical, an isopropyloxy radical, an isobutoxy radical, or an acetoxy radical. In structures (I), (II) and (III), when the subscript "m" is greater than 1, a plurality of "$R^{28}$" groups may be present. The plurality of "$R^{28}$" groups may be the same as each other or may differ from each other. For example, the composition may include both methoxy and isopropyloxy functional groups. The total number of groups, the type of groups, and the ratio of groups to each other may modulate the subsequent reaction with, and adhesion to, the filler surface.

Groups suitable as "G" in structures (I), (II) or (II) may include an aliphatic radical. The "G" group may link a sulfur atom to a silicon atom or a silicon atom to a $R^{28}$ coupling group. In one embodiment, "G" may include a divalent $C_2$-$C_{20}$ aliphatic radical. In one embodiment, "G" may include one or more of ($-CH_2CH_2-$), ($-CH_2CH_2CH_2-$), ($-CH_2CH_2CH_2CH_2-$), ($-CH(CH_3)-$), ($-CH_2CH(CH_3)-$), ($-C(CH_3)_2-$), ($-CH(C_2H_5)-$), ($-CH_2CH_2CH(CH_3)-$), ($-CH_2CH(CH_3)CH_2-$), ($-CH_2CH_2C_6H_4CH_2CH_2-$), diethylene cyclohexane, or 1,2,4-triethylene cyclohexane. In one embodiment, the sum of the carbon atoms within the "G" groups may be in the range of from about 3 to about 18. Increasing the number of carbon atoms may increase the ease of dispersion of filler within an organic elastomer matrix during compounding.

The total number of repeat units ("m+n+p") in formulae (I), (II) or (III) may be greater than or equal to about 0. In one embodiment, the total number of repeat units ("m+n+p") in formulae (I), (II) or (III) may be greater than or equal to about 10. In one embodiment, the total number of repeat units in the sulfur-functional linear polyorganosiloxane may be in a range of from about 0 to about 15, from about 15 to about 25, from about 25 to about 35, or from about 35 to about 50. In one embodiment, the total number of repeat units in the composition may be greater than about 50.

The compositions indicated by formulae (I), (II), and (III) may have a predetermined molecular weight distribution (MWD). In one embodiment, the MWD may be broad, and the indices "m" and "n" may designate an average for the composition. In one embodiment, the molecular weight distribution may be greater than about 1.5. In one embodiment, the molecular weight distribution may be in a range of from about 1 to about 1.5. The distribution of the different organosiloxane units may be random or in blocks relative to each other.

The composition may have a molecular weight in a range of greater than about 250 grams per mole. In one embodiment, the composition may have a molecular weight in a range of from about 250 grams per mole to about 1000 grams per mole, from about 1000 grams per mole to about 2000 grams per mole, from about 2000 grams per mole to about 5000 grams per mole, or from about 5000 grams per mole to about 10,000 grams per mole. In one embodiment, the molecular weight of the composition may be greater than about 10,000 grams per mole.

A rubber composition may be provided according to one aspect of the invention. The rubber composition may include an unsaturated elastomer and a composition including a sulfur-functional linear polyorganosiloxane as defined herein. The composition may include one or more chemically protected sulfur groups that may react (e.g., cross-link) with reactive groups on the unsaturated elastomer. As used herein, the term react may include cross-link, chemically bond, and cap; and, the term unsaturated elastomer may include one or more reactive carbon-carbon double bonds or carbon-carbon triple bonds.

Suitable unsaturated elastomers may include one or both of natural rubber or synthetic rubber. Representative examples of suitable synthetic rubber may include one or more of solution styrene-butadiene rubber (sSBR), emulsion styrene-butadiene rubber (eSBR), styrene-butadiene rubber (SBR), chloroprene rubber, isoprene rubber (IR), isoprene-isobutylene rubber (IIR), polybutadiene (BR), ethylene-propylene co-polymer (EP), ethylene-propylene ter-polymer (EPDM), and acrylonitrile-butadiene rubber (NBR).

Suitable diene-based synthetic rubber may be derived at least in part (as a homopolymer or a copolymer) from diene monomers, that is, monomers having two carbon-carbon double bonds, whether conjugated or not. In one embodiment, the diene-based synthetic rubber may be derived from at least one conjugated diene monomer. In one embodiment, the diene-based synthetic rubber may be derived from at least one conjugated diene monomer and at least one aromatic vinyl compound. In one embodiment, the diene-based synthetic rubber may be derived from at least one conjugated diene monomer and at least one ethylene monomer and at least one alkylene monomer.

Suitable conjugated dienes may include one or more of 1,3-butadiene, 2-methyl-1,3-butadiene (isoprene), 2,3-di($C_1$-$C_5$-alkyl)-1,3-butadienes such as, for example, 2,3-dimethyl-1,3-butadiene, 2,3-diethyl-1,3-butadiene, 2-methyl-3-ethyl-1,3-butadiene, 2-methyl-3-isopropyl-1,3-butadiene, phenyl-1,3-butadiene, 2-chloro-1,3-butadiene, 1,3-pentadiene, 2,4-hexadiene, 1,4-hexadiene, ethylidenenorbornene, or dicyclopentadiene.

Suitable aromatic vinyl compounds may include styrene or styrene derivatives (collectively "styrene"). Suitable styrene derivatives may include one or more of alkyl styrene, alkoxy styrene, or halogenated styrene. Suitable alkyl styrene may include, for example, methyl styrene or para-tert-butyl styrene. Suitable methyl styrenes may include one or more of ortho-methyl styrene, meta-methyl styrene, para-methyl styrene, or 2,4,6-trimethyl styrene (i.e., vinyl mesitylene). Suitable alkoxystyrene may include, for example, methoxystyrene. Suitable halogenated styrene may include, for example, chlorostyrene. Other suitable aromatic vinyl compounds may include divinylbenzene, vinyltoluene, or vinylnaphthalene.

Suitable unsaturated elastomers (e.g., rubber) may include one or more of cis-1,4-polyisoprene rubber (natural and/or synthetic), emulsion polymerization prepared styrene/butadiene copolymer rubber, organic solution polymerization prepared styrene/butadiene rubber, 3,4-polyisoprene rubber, isoprene/butadiene rubber, styrene/isoprene/butadiene ter-polymer rubber, cis-1,4-polybutadiene, medium vinyl polybutadiene rubber (about 35 percent to about 50 percent vinyl), high vinyl polybutadiene rubber (about 50 percent to about 75 percent vinyl), styrene/isoprene copolymers, emulsion polymerization prepared styrene/butadiene/acrylonitrile terpolymer rubber, or butadiene/acrylonitrile copolymer rubber.

The solution polymerization prepared SBR (sSBR) may have bound styrene content in a range of from about 5 to about 60 percent. A suitable emulsion polymerization derived styrene/butadiene (eSBR) may have a styrene content of, for example, about 20 percent to about 28 percent bound styrene. In one embodiment, an eSBR having a medium to relatively high bound styrene content, namely, a bound styrene content of about 30 percent to about 45 percent may be used. Emulsion polymerization prepared styrene/butadiene/acrylonitrile terpolymer rubbers may contain from about 2 weight percent to about 40 weight percent bound acrylonitrile in the terpolymer, which may be used as the unsaturated elastomer. A suitable polybutadiene elastomer may have about 90 weight percent or more cis-1,4-content. Blends of the above-mentioned rubbers may be selected having an elastomer content and ratio selected with reference to the end-use for the material.

In one embodiment, the unsaturated elastomer may be present in an amount greater than about 5 weight percent of the rubber composition. In one embodiment, the unsaturated elastomer may be present in an amount in a range of from about 5 weight percent to about 25 weight percent, from about 25 weight percent to about 50 weight percent, from about 50 weight percent to about 75 weight percent, or from about 75 weight percent to about 90 weight percent. In one embodiment, the unsaturated elastomer may be present in an amount greater than about 90 weight percent.

In one embodiment, the rubber composition may include filler. Suitable fillers may include those fillers that function as a reinforcing filler. The filler may include one or both of carbon or silicon. In one embodiment, the filler may be an inorganic filler. Suitable inorganic filler may include one or both of metal oxide or metal hydroxide. Suitable metal oxides or hydroxides may include one or more oxides or hydroxides of aluminum, magnesium, calcium, barium, zinc or titanium. In one embodiment, aluminum oxide (alumina) or hydroxide may be used as a filler. In one embodiment, silicon dioxide (silica) or hydroxide may be used as a filler. The silica used may include precipitated silica, or pyrogenic silica. In one embodiment, the silica may be colloidal silica.

In one embodiment, the filler may be inorganic filler and may include one or more of synthetic silicate, natural silicate, or glass fiber. Suitable examples of synthetic silicates may include magnesium silicate or calcium silicate. Suitable examples of natural silicates may include kaolin, clay, or talc.

Suitable examples of silica may include commercially available silicas, such as those available from PPG Industries under the HI-SIL trademark with designations HI-SIL 210 and HI-SIL 243; silica available from Rhone-Poulenc having a designation of ZEOSIL 1165MP; silicas available from Degussa having a designation of VN2 or VN3; and, silica commercially available from Huber having a designation of HUBERSIL 8745.

In one embodiment, the filler may be an organic filler and may include carbon black. Suitable carbon black may include type HAF, ISAF or SAF. Suitable examples of such carbon blacks may include, but may not be limited to, N115, N121, N134, N234, N339, N347 or N37, available from Degussa Engineered Carbons.

In one embodiment, the filler, e.g., silica, may have a BET surface area as measured using nitrogen gas that is greater than about 40 $m^2/g$. In one embodiment, the surface area may be in a range of from about 40 $m^2/g$ to about 100 $m^2/g$, from about 100 $m^2/g$ to about 250 $m^2/g$, from about 250 $m^2/g$ to about 500 $m^2/g$, from about 500 $m^2/g$ to about 600 $m^2/g$, or greater than about 600 $m^2/g$. The BET specific surface area may be determined in accordance with the method of Brunauer, Emmett and Teller (BET) described in "The Journal of the American Chemical Society", vol. 60, page 309, February 1938. The silica may also be characterized by having a dibutylphthalate (DBP) absorption value in a range of from about 100 to about 200, or in a range of from about 200 to about 300. Further, the silica, as well as the aforesaid alumina, aluminosilicate, and the like may have a CTAB surface area in a range of from about 100 to about 220. The CTAB surface area may be the external surface area as evaluated by cetyl trimethyl ammonium bromide with a pH of 9 and may be determined in accordance with ASTM D 3849.

A suitable pore size distribution for the silica, alumina, and aluminosilicate according to a mercury porosity evaluation may be considered herein to be: 5 percent or less of the pores may have a diameter of less than about 10 nanometers; 60 percent to 90 percent of the pores have a diameter in the range of from about 10 nanometers to about 100 nanometers; 10 percent to 30 percent of the pores have a diameter in the range of from about 100 nanometers to about 1,000 nanometers; and 5 percent to 20 percent of the pores have a diameter of greater than about 1,000 nanometers. Mercury porosity surface area may be the specific surface area determined by mercury porosimetry. For such technique, mercury may be penetrated into the pores of the sample after a thermal treatment to remove volatiles. Set up conditions may be suitably described as using a 100 milligrams sample, removing volatiles during two hours at 105 degrees Celsius. and ambient atmospheric pressure, ambient to 2000 bars pressure measuring range. Such evaluation may be performed according to the method described in DIN 66133. The average mercury porosity specific surface area for the silica may be in a range of from about 100 $m^2/g$ to about 300 $m^2/g$.

Suitable total amounts of filler may be greater than about 10 phr (parts by weight per hundred parts of rubber or unsaturated elastomer). In one embodiment, the amount of total filler may be in a range of from about 10 phr to about 40 phr, from about 40 phr to about 80 phr, from about 80 phr to about 120 phr, or from about 120 phr to about 200 phr. In one embodiment, the filler may be present in an amount greater than about 200 phr. The optimum value of the total amount of filler may differ according to the intended end-use application, the characteristics and interaction of the composition and the filler, and the level of reinforcement required.

If a rubber composition includes both an inorganic filler and an organic filler, the ratio of inorganic to organic filler may be selected to achieve predetermined properties. As noted hereinabove, inorganic material may include silica, and organic filler may include carbon black reinforcing pigments, so an example of pre-selection of a ratio, by weight, of silica to carbon black may be at least about 3/1, at least about 10/1, or up to about 30/1. In one embodiment, the filler mixture may include from about 5 weight percent to about 50 weight percent precipitated silica and a corresponding about 95 weight percent to about 50 weight percent carbon black. In one embodiment, the filler mixture may include about 50 weight percent to about 95 weight percent of silica and a corresponding about 50 weight percent to about 5 weight percent carbon black. Thus, the total weight of the filler mixture may be 40 phr. The filler mixture may include 40 weight percent precipitated silica and 60 weight percent carbon black corresponding to 16 phr of precipitated silica and 24 phr of carbon black in the rubber composition. The inorganic filler and carbon black may be pre-blended, or may be added separately to, and blended together during, the manufacture of the rubber composition.

The rubber composition may further include a curing agent. Curing agents may collectively refer to sulfur vulcanizing agents and vulcanization accelerators. Suitable sulfur vulcanizing agents may include, for example elemental sulfur (free sulfur) or sulfur donating vulcanizing agents that may make sulfur available for vulcanization at a temperature of about 140 degree Celsius to about 190 degree Celsius. Suitable examples of sulfur donating vulcanizing agents may include amino disulfide, polymeric polysulfide or sulfur olefin adducts.

The rubber composition may further include a vulcanizing accelerator. Vulcanizing accelerators may control the time and/or temperature required for vulcanization and to affect the properties of the vulcanizate. Vulcanization accelerators may be classified as a primary accelerator or a secondary accelerator. Suitable accelerators may include one or more of mercapto benzothiazole; tetramethyl thiuram disulfide; benzothiazole disulfide; diphenyl guanidine; zinc dithiocarbamate; alkylphenol disulfide; zinc butyl xanthate; N-dicyclohexyl-2-benzothiazolesulfenamide; N-cyclohexyl-2-benzothiazole sulfenamide; N-oxydiethylene benzothiazole-2-sulfenamide; N,N-diphenyl thiourea; dithiocarbamyl sulfenamide; N,N-diisopropyl benzothiozole-2-sulfenamide; zinc-2-mercapto toluimidazole; dithio bis(N-methyl piperazine); dithio bis(N-beta-hydroxy ethyl piperazine); and dithio bis(dibenzyl amine). Other vulcanizing accelerators may include, for example, thiuram and/or morpholine derivatives.

The amount and/or type of sulfur addition may be controlled or manipulated relatively independently of, but with regard to, the addition of the aforesaid composition including the sulfur-functional linear polyorganosiloxane. In one embodiment, if an additional sulfur source is present as a component of the curing agent, the composition according to an embodiment of the invention may function as a secondary cross-linking agent.

In one embodiment, the composition may provide secondary chemical crosslinks that differ from those crosslinks obtained from the addition of primary vulcanizing agent. The secondary cross-links may increase a modulus of the continuous phase and may affect the mechanical properties. Such mechanical properties may include one or more of tensile modulus, hardness, hysteresis, and wear/tear/abrasion resistance. By adjusting the relative amounts of primary and secondary crosslinking agents added to a given formulation, the modulus of the final compound, as well as the rate of the vulcanization process may be controlled.

The rubber composition may further include a deblocking agent. The deblocking agent may activate, or unblock, a chemically-protected sulfur group. The protecting group initially present on the composition may respond to the deblocking agent by switching from a substantially inactive state to an active state in which the sulfur group may be available to react to unsaturated portions of the elastomer.

Suitable deblocking agents may include a nucleophile that contains a hydrogen atom sufficiently labile such that hydrogen atom may be transferred to a site on the chemically-protected sulfur group. The chemically-protected sulfur group site may respond to the hydrogen transfer to form, for example, a mercapto functionalized linear polyorganosiloxane and a corresponding derivative of the nucleophile. In an exchange, the nucleophile derivative may receive back the protecting group. Such an exchange may be driven by, for example, a greater thermodynamic stability of the products (mercapto functionalized linear polyorganosiloxane and nucleophile containing the blocking group) relative to the initial reactants (sulfur functionalized linear polyorganosiloxane and nucleophile). By way of example, a carboxyl blocking group deblocked by reaction with an amine may yield an amide, a sulfonyl blocking group deblocked by an amine may yield a sulfonamide, a sulfinyl blocking group deblocked by an amine may yield a sulfinamide, a phosphonyl blocking group deblocked by an amine may yield a phosphonamide, and a phosphinyl blocking group deblocked by an amine may yield a phosphinamide.

Suitable deblocking agents may include a nucleophilic material. Examples of nucleophilic materials may include oxides, hydroxides, carbonates, bicarbonates, alkoxides, phenoxides, sulfanamide salts, acetyl acetonates, carbon anions derived from high acidity C—N bonds, malonic acid esters, cyclopentadienes, phenols, sulfonamides, nitrites, fluorenes, tetra-alkyl ammonium salts, and tetra-alkyl phosphonium salts. Partial amounts of the nucleophile may also be used (i.e., a stoichiometric deficiency), or even weak nucleophile, if one was to deblock only part of the sulfur-functional linear polyorganosiloxane to control the degree of vulcanization of a specific formulation. In one embodiment, trimethylolpropane may be a deblocking agent. In one embodiment, the deblocking agent may be the same as the vulcanization accelerator.

In one embodiment, a method may produce a composition including a sulfur-functional linear polyorganosiloxane. The method may involve esterification of sulfur in a sulfur-containing linear polyorganosiloxane, or may include direct incorporation of a thioester group into a linear polyorganosiloxane. Direct incorporation may be by substitution of an appropriate leaving group or by addition across a carbon-carbon double bond.

In one embodiment, the method may include reacting a linear polyorganosiloxane having an alkene group with a thio acid having a structure as defined in formula (IV):

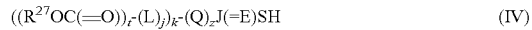

$$((R^{27}OC(=O))_t\text{-}(L)_j)_k\text{-}(Q)_z J(=E)SH \qquad (IV)$$

wherein $R^{27}$ is an aliphatic radical, a cycloaliphatic radical, or an aromatic radical; L is independently at each occurrence a monovalent group or a polyvalent group that is derived by substitution of an aliphatic radical, a cycloaliphatic radical, or an aromatic radical;

Q is oxygen, sulfur, or an $NR^{29}$ group, wherein $R^{29}$ is an aliphatic radical, a cycloaliphatic radical, or an aromatic radical;

J is carbon, sulfur, phosphorus, or a sulfonyl group;

E is oxygen or sulfur;

S comprises one or more sulfur atoms;

"t" is an integer that is equal to 0, 1, 2, 3, 4, or 5; "j" is equal to 0 or 1, "k" is equal to 1 if J is carbon, sulfur or sulfonyl, "k" is 2 if J is phosphorus; and "z" is equal to 0, 1, or 2.

In one embodiment, the thio acid may be a thio carboxylic acid, $R^{30}C(=O)SH$, wherein $R^{30}$ may be an aliphatic radical. In one embodiment, the thio carboxylic acid may be one of thio acetic acid or thio octanoic acid.

A reaction between the linear polyorganosiloxane having an alkene group and a thioacid may be a hydrosilylation reaction. The hydrosilylation reaction may be catalyzed by use of one or more hydrosilylation catalysts. Suitable hydrosilylation catalysts may include one or more of rhodium, platinum, palladium, nickel, rhenium, ruthenium, osmium, copper, cobalt, or iron. A suitable platinum catalyst may have the formula $(PtCl_2Olefin)$ or $H(PtCl_3Olefin)$. Another suitable platinum catalyst may include a cyclopropane complex or a complex formed from chloroplatinic acid with up to 2 moles per gram of platinum and one or more of alcohols, ethers, or aldehydes.

The alkene group in the linear polyorganosiloxane may be present at one terminal end of the linear polyorganosiloxane (forming Structure (II)); at both the terminal ends of the linear polyorganosiloxane (forming structure (I)); or pendent at one or more points to the linear polyorganosiloxane backbone (forming structure (III)).

In one embodiment, the sulfur-functional linear polyorganosiloxane may further include a functional group ($R^{28}$ in structures I, II and III) that may couple with a filler surface. The functional group $R^{28}$ may either be initially present (for example, hydroxyl or halogen) in the linear polyorganosiloxane having the alkene groups or may be incorporated in the linear polyorganosiloxane (for example, alkoxy or aryloxy). In one embodiment, the functional group $R^{28}$ may be incorporated by reacting a suitable alcohol with a linear polyorganosiloxane, having one or more of —SiH groups.

Suitable alcohols may include one or more of monohydric linear alkanols. Suitable alkanols may include one or more of methanol, ethanol, isopropanol or butanol.

Suitable linear polyorganosiloxanes having one or more of an alkene group and optionally one or more of a —SiH group may include structures of formula (V), (VI) or (VII).

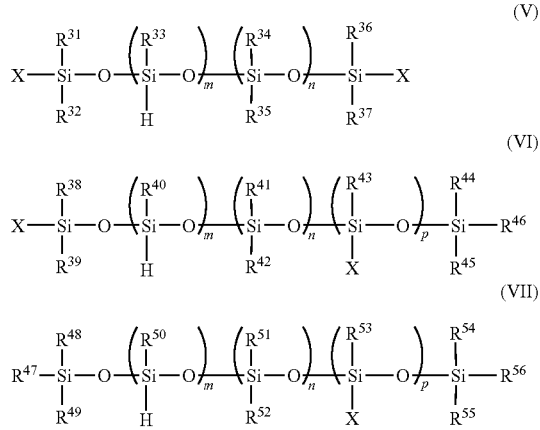

wherein $R^{31}$-$R^{56}$ may be independently at each occurrence a hydrogen atom, an aliphatic radical, a cycloaliphatic radical, or an aromatic radical;

"m" and "n" are independently equal to 0 or are an integer greater than 0; "p" is greater than 0; and X may be a group having a structure as defined in formula (VIII):

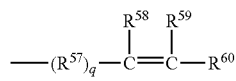

wherein $R^{57}$ may be an aliphatic radical, a cycloaliphatic radical, or an aromatic radical, $R^{58}$-$R^{60}$ may be independently at each occurrence a hydrogen atom, an aliphatic radical, a cycloaliphatic radical, or an aromatic radical, and "q" may be an integer equal to from 1 to about 10.

In one embodiment, the alkene group may be an ethylene group. Ethylene group falls within generic formula (VIII) and represents a case where "q" may be 0 and $R^{58}$-$R^{60}$ may be all hydrogen atoms. In one embodiment, the alkene group may be an allyl group. Allyl group falls within generic formula (VIII) and represents the case where "q" may be 1, $R^{57}$ may be a methylene radical and $R^{58}$-$R^{60}$ may be all hydrogen atoms. In one embodiment, the alkene group may be a methallyl group. Methallyl group falls within generic formula (VIII) and represents the case where "q" may be 1, $R^{57}$ may be a methylene radical, $R^{58}$ may be a methyl radical, and $R^{59}$ and $R^{60}$ both may be hydrogen atoms.

In one embodiment, a composition including the reaction product of a linear polyorganosiloxane and a thioacid may be provided. The linear polyorganosiloxane may include an alkene group and the thio acid may have a structure as defined by formula (IV) described herein above.

The composition may be mixed with an unsaturated elastomer (i.e., rubber) to form a rubber composition. One or more of filler, a curing agent, or a deblocking agent may be added to the rubber composition. The rubber composition may be processed, such as by molding or extruding, prior to vulcanization or cross-linking. The rubber composition may be vulcanized to form a vulcanized rubber article.

During the preparation of a rubber composition, preparatory mixing or nonproductive mixing, may include mixing prior to the addition of curatives or deblocking agents, and may be performed at relatively low temperatures to reduce or eliminate cross-linking. Such preparatory mixing may be conducted at temperatures in a range of from about 120 degrees Celsius to about 150 degrees Celsius, from about 150 degrees Celsius to about 180 degrees Celsius, or from about 180 degrees Celsius to about 200 degrees Celsius.

In one embodiment, the rubber composition may be prepared or compounded by thermomechanically mixing. Thermomechanical mixing may include mixing the rubber composition, and filler and additives, under high shear conditions. Under these conditions, the rubber composition may heat due to shear and associated friction.

Subsequent to preparatory mixing, a productive mixing may be employed. Productive mixing may include adding to the rubber composition one or more of a deblocking agent, curing agent, or additive. The temperature of mixing may be determined based on reactivity, but may be in a range of from about 50 degrees Celsius to about 130 degrees Celsius. Lower mixing temperatures may prevent or retard premature curing of the sulfur curable rubber. The vulcanized rubber composition, may be allowed to cool.

The rubber composition may be processed (e.g., molded or extruded) during vulcanization to form a vulcanized rubber article. To mold the rubber composition, the rubber composition may be placed into a mold and heated to a temperature sufficient to initiate cross-linking. The molding may vulcanize the rubber composition by reacting the unblocked sulfur groups on the composition with the unsaturated elastomer.

Chemical reactions may occur at distinguishable steps during the mixing and curing processes. A first reaction may be a relatively fast reaction and may take place between the filler and the composition. The first reaction may occur if the composition includes a suitable group that couples to a filler, for example the "$R^{28}$" group of structures (I), (II), and (III). Filler coupling may occur at a relatively low temperature such as, for example, at about 120 degrees Celsius during a preparatory mixing stage.

The second reaction may deblock the chemically-protected sulfur group(s) of the composition, and may occur in a productive mix stage. The de-blocking may expose the sulfur groups and prepare them for reaction with the unsaturated groups on the elastomer.

The third reaction may include reacting sulfur group(s) with the unsaturated groups on the elastomer. The cross-link density may be controlled by selection of the number and type of chemically-protected sulfur groups, the degree of unsaturation of the elastomer, and additives (such as additional curatives), and the curing temperature. The composition according to an embodiment of the invention may have one or more of a relatively low processing viscosity, a desirable filler dispersion, a relatively reduced tendency to scorch, and a relatively reduced odor.

In one embodiment, the "$R^{28}$" group of the composition may be reacted with the filler during a preparatory mixing stage. Coupling of the filler/composition to the unsaturated elastomer may be temporarily precluded to minimize or eliminate scorch and/or viscosity increase. In subsequently vulcanized articles, this reduction or elimination of scorch may provide a desired balance of modulus and abrasion resistance (for example, hardness).

The vulcanized rubber composition may have a tensile strength that is greater than about 19.5 megaPascal according to ASTM D412. In one embodiment, the vulcanized rubber composition may have a tensile strength in a range of from about 19.5 megaPascal to about 20 megaPascal, from about 20 megaPascal to about 21 megaPascal, from about 21 megaPascal to about 22 megaPascal, or from about 22 megaPascal to about 22.5 megaPascal. In one embodiment, the vulcanized rubber composition may have a tensile strength that is greater than about 22.5 megaPascal.

The vulcanized rubber composition may have an elongation at break that is greater than about 400 percent according to ASTM D412. In one embodiment, the vulcanized rubber composition may have an elongation at break in a range of from about 400 percent to about 500 percent, from about 500 percent to about 550 percent, from about 550 percent to about 600 percent or from about 600 percent to about 650 percent. In one embodiment, the vulcanized rubber composition may have an elongation at break that is greater than about 650 percent.

The vulcanized rubber composition may have hardness greater than about 56 Shore A according to ASTM D2240. In one embodiment, the vulcanized rubber composition may have a hardness in a range of from about 55 Shore A to about 57 Shore A, from about 57 Shore A to about 59 Shore A, from about 59 Shore A to about 61 Shore A, or from about 61 Shore A to about 62 Shore A. In one embodiment, the vulcanized rubber composition may have hardness greater than about 62 Shore A.

The vulcanized rubber composition may have a tensile modulus at 300 percent strain greater than about 7 megaPascal (1 megaPascal is equal to $1\times10^7$ dynes/cm$^2$) according to ASTM D412. In one embodiment, the vulcanized rubber composition may have a tensile modulus at 300 percent strain in a range of from about 7 megaPascal to about 9 megaPascal, from about 9 megaPascal to about 11 megaPascal, from about 11 megaPascal to about 13 megaPascal, or from about 13 megaPascal to about 16 megaPascal. In one embodiment, the vulcanized rubber composition may have a tensile modulus at a 300 percent strain greater than about 16 megaPascal.

The vulcanized rubber composition may have a tensile modulus at 100 percent strain greater than about 1.5 megaPascal according to ASTM D412. In one embodiment, the vulcanized rubber composition may have a tensile modulus at 100 percent strain in a range of from about 1.5 megaPascal to about 1.8 megaPascal, from about 1.8 megaPascal to about 2.1 megaPascal, from about 2.1 megaPascal to about 2.4 megaPascal, or from about 2.4 megaPascal to about 2.7 megaPascal. In one embodiment, the vulcanized rubber composition may have a tensile modulus at a 100 percent strain greater than about 2.7 megaPascal.

The vulcanized rubber article formed from the vulcanized rubber composition may include one or more of cable sheath, hose, transmission belt, conveyor belt, roller coating, packing ring, damping element, or shoe sole.

The examples provided are merely representative of the work that contributes to the teaching of the present application. Accordingly, these examples do not limit the invention as defined in the appended claims.

EXAMPLES

Example 1

Preparation of Polydimethylsiloxane (PDMS) with Thio-Acetate End Caps

A vinyl-terminated PDMS fluid (312 grams, GE Silicones 81865, MW ~1670 grams per mole) is charged into a three-necked 1 Liter round-bottomed flask equipped with an immersible Teflon-coated thermocouple, a large magnetic stir bar, water-cooled straight-bore condenser and a septum inlet. A magnetic stirrer agitates the PDMS mixture and a thin stream of air is bubbled into the PDMS fluid by means of fine-gauge Teflon capillary tube lowered into the fluid. A 5 percent stoichiometric excess of thio acetic acid is added dropwise over the course of 3 hours through a fine-gauge Teflon cannula. The rate of addition is controlled such that the temperature of the reaction mixture approaches, but does not exceed 40 degree Celsius due to the strong reaction exotherm. The mixture is then allowed to stir overnight with continued air bubbling. The mixture is stripped of volatile contaminants and unreacted thio acetic acid by vigorous stirring under dynamic vacuum at 100 degree Celsius, trapping the volatiles in a liquid nitrogen-cooled trap, and 314.8 grams of PDMS end-capped with thio-acetate groups is isolated. NMR spectroscopy shows ~98 percent conversion of the vinyl groups in the starting material and an approximate beta- to alpha-addition ratio for the thio acetyl group equal to 9:1. Hereinafter, a polydimethylsiloxane with thio-acetate end caps produced by the method described in Example 1 will be referred to as S-PDMS.

Example 2

Preparation of Sample 1

A formulation as described in Table 1 is used to compound a rubber formulation containing S-PDMS, the rubber formulation is hereinafter referred to as Sample 1. A two-step mixing process is used to compound these materials. In the first mixing step, the elastomer (Natural Rubber), carbon black (N121), stearic acid, zinc oxide, wax, antiozonants, antioxidants, and deblocking agents are added to Brabender batch mixer, preheated to a temperature of 50 degrees Celsius. The mixer speed is increased in a stepwise manner to 80 rpm and the temperature is increased to 150 degrees Celsius after the addition of the ingredients. After cooling, the vulcanizing package, including the S-PDMS and accelerator (optional), is added in the second mixing step to the mixer rotating at 40 rpm and at a temperature of 50 degrees Celsius. Some amount of carbon black is also added in the second mixing step to densify the (liquid) PDMS, and thus facilitate its addition to the mixture inside the bowl. The temperature of the mixer is increased to 100 degrees Celsius, after which the rubber formulation is removed from the mixer.

Comparative Example 1

Preparation of Sample 2

A formulation as described in Table 1 is used to compound a rubber formulation containing no sulfur, the rubber formulation is hereinafter referred to as Sample 2. The method of compounding the rubber formula is same as described in Example 2, except no S-PDMS is added.

Comparative Example 2

Preparation of Sample 3

A formulation as described in Table 1 is used to compound a rubber formulation containing a polydimethylsiloxane with Table 1 shows the rheology results for Samples 1, 2, 3 and 4. The final storage modulus for Example 2 (Sample 1) is greater than Comparative Example 1 (Sample 2). The final storage modulus for Example 2 (Sample 1) is similar to that of Comparative Example 2 (Sample 3) and greater than that of Comparative Example 3 (Sample 4).

TABLE 1

Rubber Formulations and rheology results for Samples 1-4.

| | Material | Sample 1 Weight (Grams) | Sample 2 Weight (Grams) | Sample 3 Weight (Grams) | Sample 4 Weight (Grams) |
|---|---|---|---|---|---|
| $1^{st}$ Mixing Step | Natural Rubber | 191.70 | 191.70 | 191.70 | 191.70 |
| | Carbon Black | 86.34 | 95.77 | 86.31 | 86.34 |
| | Stearic Acid | 3.84 | 3.83 | 3.85 | 3.84 |
| | Zinc Oxide | 5.78 | 5.77 | 5.79 | 5.78 |
| | 6PPD | 2.89 | 2.88 | 2.89 | 2.90 |
| | DTPD | 1.93 | 1.93 | 1.93 | 1.93 |
| | Ozon | 4.82 | 4.80 | 4.80 | 4.84 |
| $2^{nd}$ Mixing Step | CBS | 3.81 | 0.00 | 3.80 | 0.00 |
| | Carbon Black | 9.48 | 0.00 | 9.48 | 9.48 |
| | S-PDMS | 18.95 | 0.00 | 0.00 | 0.00 |
| | M-PDMS | 0.00 | 0.00 | 18.95 | 18.97 |
| | Elemental Sulfur | 0.00 | 0.00 | 0.62 | 0.00 |
| | Final Storage Modulus ($10^6$ dyn/cm$^2$) | 3.79 | 2.84 | 3.68 | 2.09 | methyl end caps (M-PDMS), the rubber formulation is hereinafter referred to as Sample 3. The method of compounding the rubber formula is same as described in Example 2, except a polydimethylsiloxane with methyl end caps is added during the second mixing step.

Comparative Example 3

Preparation of Sample 4

A formulation as described in Table 1 is used to compound a rubber formulation containing a polydimethylsiloxane with methyl end caps (M-PDMS) and elemental sulfur, the rubber formulation is hereinafter referred to as Sample 4. The method of compounding the rubber formula is same as described in Example 2, except a polydimethylsiloxane with methyl end caps and elemental sulfur are added during the second mixing step. The molar amount of sulfur in the formulation is the same as that in Example 2 (Sample 1).

Example 3

Curing Results

A parallel-plate rheometer is used to study the curing characteristics of Samples 1, 2, 3 and 4. The specimen tested in the rheometer is 25 millimeters in diameter, and between 1.6 and 2 millimeters in thickness. A normal force of 100 grams is applied on the sample at all times during testing. The test is conducted at 160 degrees Celsius, 10 radians/second frequency, 2 percent strain, for a time that is either 30 or 60 minutes. The two platens of the rheometer are serrated to prevent the specimen from slipping at the interface between the sample and the surface of the platen. Storage moduli are measured for Samples 1, 2, 3 and 4 as a function of curing time.

Example 4

Preparation of Sample 5

A formulation as described in Table 2 is used to compound a rubber formulation containing a polydimethylsiloxane with thioacetate end caps (S-PDMS) and elemental sulfur, the rubber formulation is hereinafter referred to as Sample 5. The method of compounding the rubber formula is same as described in Example 2, except elemental sulfur is also added during the second mixing step.

Example 5

Preparation of Sample 6

A formulation as described in Table 2 is used to compound a rubber formulation containing a polydimethylsiloxane with thioacetate end caps (S-PDMS) and elemental sulfur, the rubber formulation is hereinafter referred to as Sample 6. The method of compounding the rubber formula is same as described in Example 2, except elemental sulfur is also added during the second mixing step and the amount of accelerator (CBS) and elemental sulfur is varied.

Example 6

Preparation of Sample 7

A formulation as described in Table 2 is used to compound a rubber formulation containing a polydimethylsiloxane with thioacetate end caps (S-PDMS) and elemental sulfur, the rubber formulation is hereinafter referred to as Sample 7. The method of compounding the rubber formula is same as described in Example 2, except elemental sulfur is also added during the second mixing step and the amount of accelerator (CBS) and elemental sulfur is varied.

Example 7

Preparation of Sample 8

A formulation as described in Table 2 is used to compound a rubber formulation containing a polydimethylsiloxane with thioacetate end caps (S-PDMS) and elemental sulfur, the rubber formulation is hereinafter referred to as Sample 8. The method of compounding the rubber formula is same as described in Example 2, except elemental sulfur is also added during the second mixing step and the amount of accelerator (CBS) and elemental sulfur is varied.

Comparative Example 4

Preparation of Sample 9

A formulation as described in Table 2 is used to compound a rubber formulation containing only elemental sulfur, the rubber formulation is hereinafter referred to as Sample 9. The method of compounding the rubber formula is same as described in Example 2, except only elemental sulfur is added and no S-PDMS is added.

Comparative Example 5

Preparation of Sample 10

A formulation as described in Table 2 is used to compound a rubber formulation containing only elemental sulfur, the rubber formulation is hereinafter referred to as Sample 10. The method of compounding the rubber formula is same as described in Example 2, except only elemental sulfur is added; no S-PDMS is added; and the amount of accelerator (CBS) and elemental sulfur is varied.

Comparative Example 6

Preparation of Sample 11

A formulation as described in Table 2 is used to compound a rubber formulation containing only elemental sulfur, the rubber formulation is hereinafter referred to as Sample 11. The method of compounding the rubber formula is same as described in Example 2, except polydimethylsiloxane with methyl end caps is added along with elemental sulfur.

Comparative Example 7

Preparation of Sample 12

A formulation as described in Table 2 is used to compound a rubber formulation containing only elemental sulfur, the rubber formulation is hereinafter referred to as Sample 12. The method of compounding the rubber formula is same as described in Example 2, except polydimethylsiloxane with methyl end caps is added along with elemental sulfur and the amount of accelerator (CBS) and elemental sulfur is varied.

Example 8

Physical Testing

The cured rubber compositions of Samples 5-12 are tested for tensile strength, elongation at break, tensile modulus at 300% strain, tensile modulus at 100% strain according to ASTM D412. $\Delta G'$ (time sweep) and $\Delta G'$ (strain sweep) (reference to ASTM D6601-02). The cured rubber compositions of Samples 5-12 are tested for Shore hardness according to ASTM D2240. The results obtained are tabulated in Table 3.

TABLE 2

Rubber Formulations for Samples 5-12.

| Material | 5 phr | 6 phr | 7 phr | 8 phr | 9 phr | 10 phr | 11 phr | 12 phr |
|---|---|---|---|---|---|---|---|---|
| Natural Rubber | 100.0 | 100.0 | 100.0 | 100.0 | 100.0 | 100.0 | 100.0 | 100.0 |
| Carbon Black | 48.0 | 48.0 | 48.0 | 48.0 | 48.0 | 48.0 | 48.0 | 48.0 |
| Stearic Acid | 2.0 | 2.0 | 2.0 | 2.0 | 2.0 | 2.0 | 2.0 | 2.0 |
| Zinc Oxide | 3.0 | 3.0 | 3.0 | 3.0 | 3.0 | 3.0 | 3.0 | 3.0 |
| 6PPD | 1.5 | 1.5 | 1.5 | 1.5 | 1.5 | 1.5 | 1.5 | 1.5 |
| DTPD | 1.0 | 1.0 | 1.0 | 1.0 | 1.0 | 1.0 | 1.0 | 1.0 |
| Ozon | 2.5 | 2.5 | 2.5 | 2.5 | 2.5 | 2.5 | 2.5 | 2.5 |
| CBS | 3.0 | 7.2 | 3.0 | 7.2 | 3.0 | 7.2 | 3.0 | 7.2 |
| Carbon Black | 5.0 | 5.0 | 5.0 | 5.0 | 5.0 | 5.0 | 5.0 | 5.0 |
| S-PDMS | 10.0 | 10.0 | 10.0 | 10.0 | 0.0 | 0.0 | 0.0 | 0.0 |
| M-PDMS | 0.0 | 0.0 | 0.0 | 0.0 | 0.0 | 0.0 | 10.0 | 10.0 |
| Elemental Sulfur | 0.31 | 1.01 | 0.5 | 1.2 | 0.5 | 1.2 | 0.5 | 1.2 |
| Total sulfur content (mmole) | 39.9 | 78.1 | 50.9 | 88.7 | 29.1 | 67.5 | 29.1 | 67.5 |

TABLE 3

Physical testing results for Samples 5-12

| Property | 5 | 6 | 7 | 8 | 9 | 10 | 11 | 12 |
|---|---|---|---|---|---|---|---|---|
| Tensile Strength (MPa) | 18.08 | 20.02 | 21.65 | 20.46 | 25.53 | 20.20 | 21.75 | 19.28 |
| Elongation at Break (%) | 561.1 | 376.8 | 565.4 | 385.1 | 544.0 | 310.0 | 535.3 | 366.8 |

TABLE 3-continued

Physical testing results for Samples 5-12

| Property | Sample Number | | | | | | | |
|---|---|---|---|---|---|---|---|---|
| | 5 | 6 | 7 | 8 | 9 | 10 | 11 | 12 |
| Modulus at 300% strain (MPa) | 6.88 | 14.92 | 9.55 | 16.3 | 12.69 | 19.76 | 10.08 | 17.44 |
| Modulus at 100% strain (MPa) | 1.21 | 3.21 | 1.71 | 3.67 | 2.29 | 4.51 | 1.9 | 4.08 |
| ΔG' (time sweep) (×10⁶ dyn/cm²) | 5.2 | 12.9 | 7.7 | 10.8 | 7.9 | 15.1 | 5.92 | 11.88 |
| ΔG' (strain sweep) (×10⁶ dyn/cm²) | 50.8 | 88.6 | 57.6 | 88.1 | 63.1 | 104.6 | 57.9 | 83.4 |
| Hardness (Shore A) | 52.7 | 68.5 | 56.6 | 70.6 | 61.9 | 73.1 | 57.5 | 69.8 |

The foregoing examples are merely illustrative of some of the features of the invention. The appended claims are intended to claim the invention as broadly as it has been conceived and the examples herein presented are illustrative of selected embodiments from a manifold of all possible embodiments. Accordingly it is Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied, those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A tire composition, comprising:
   an unsaturated elastomer; and
   a sulfur-functional linear polyorganosiloxane comprising a chemically-protected sulfur group capable of reacting with the unsaturated elastomer, wherein the sulfur-functional linear polyorganosiloxane has a formula of (I), (II) or (III):

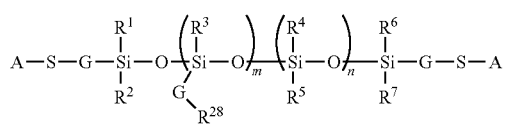

(I)

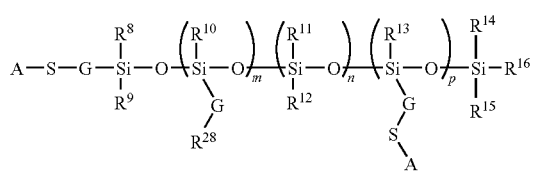

(II)

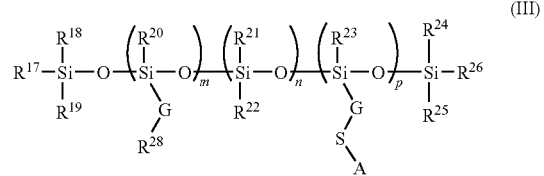

(III)

wherein A is a $((R^{27}OC(=O))_t\text{-}(L)_j)_k\text{-}(Q)_zJ(=E)$ group;
$R^1\text{-}R^{27}$ are independently at each occurrence a hydrogen atom, an aliphatic radical, a cycloaliphatic radical, or an aromatic radical;
G is a divalent aliphatic radical, a divalent cycloaliphatic radical, or a divalent aromatic radical;
$R^{28}$ is a hydroxyl group, a halogen atom, a silyl alkoxy group, an alkoxy group, or an aryloxy group;
S is one or more sulfur atoms;
L is independently at each occurrence a monovalent or a polyvalent group derived by substitution of an aliphatic radical, a cycloaliphatic radical, or an aromatic radical;
Q is oxygen, sulfur or an $NR^{29}$ group, $R^{29}$ is an aliphatic radical, a cycloaliphatic radical, or an aromatic radical;
J is carbon, sulfur, phosphorus, or a sulfinyl group;
E is oxygen or sulfur;
"m" is equal to an integer greater than 0; "n" is equal to an integer greater than 0; "p" is greater than 0; "t" is an integer that is equal to 0, 1, 2, 3, 4, or 5; "j" is equal to 0 or 1; "k" is equal to 1 if J is carbon, sulfur or sulfinyl, "k" is 2 if J is phosphorus; and "z" is an integer that is equal to 0, 1, or 2.

2. The composition as defined in claim 1, wherein the sulfur-functional linear polyorganosiloxane further comprises a functional group capable of coupling with a filler surface.

3. The composition as defined in claim 2, wherein -G-$R^{28}$ is the functional group capable of coupling to a filler surface.

4. The composition as defined in claim 1, wherein $R^{28}$ is one or more of a hydroxyl group, a methoxy group, an ethoxy group, an isopropyloxy group, an isobutoxy group, or an acetoxy group.

5. The composition as defined in claim 1, wherein the sulfur-functional linear polyorganosiloxane has a molecular weight in a range greater than about 250 grams per mole.

6. The composition as defined in claim 1, wherein G is one or more of (—CH₂CH₂—), (—CH₂CH₂CH₂—), (—CH₂CH₂CH₂CH₂—), (—CH(CH₃)—), (—CH₂CH(CH₃)—), (—C(CH₃)₂—), (—CH(C₂H₅)—), (—CH₂CH₂CH(CH₃)—), (—CH₂CH(CH₃)CH₂—), (—CH$_2$CH$_2$(C$_6$H$_4$)CH$_2$CH$_2$—), diethylene cyclohexane, or 1,2,4-triethylene cyclohexane.

7. The composition as defined in claim 1, further comprising a filler.

8. The composition as defined in claim 7, wherein the filler comprises one or both of metal oxide or metal hydroxide.

9. The composition as defined in claim 7, wherein the filler comprises one or both of carbon or silicon.

10. The composition as defined in claim 9, wherein the filler comprises carbon black.

11. The composition as defined in claim 7, wherein the filler comprises one or more of silica, synthetic silicate, natural silicate, or glass fiber.

12. The composition as defined in claim 1, wherein the unsaturated elastomer comprises natural rubber.

13. The composition as defined in claim 1, wherein the unsaturated elastomer comprises synthetic rubber.

14. The composition as defined in claim 13, wherein the synthetic rubber is diene-based.

15. The composition as defined in claim 1, further comprising a deblocking agent that is capable of activating the chemically-protected sulfur groups.

16. The composition as defined in claim 1, wherein the unsaturated elastomer is present in an amount greater than about 10 weight percent.

17. The composition as defined in claim 1, further comprising a curing agent.

18. A vulcanized tire composition comprising a vulcanized product of the composition of claim 17.

19. The vulcanized rubber composition of claim 18, having a tensile strength greater than about 19.5 megaPascal according to ASTM D412.

20. The vulcanized rubber composition of claim 18, having an elongation at break greater than about 400 percent according to ASTM D412.

21. The vulcanized tire composition of claim 18, having a modulus at 300 percent strain greater than about 7 megaPascal according to ASTM D412.

22. The vulcanized tire composition of claim 18, having a modulus at 100 percent strain greater than about 1.5 megaPascal according to ASTM D412.

23. The vulcanized tire composition of claim 18, having a hardness greater than about 56 Shore A according to ASTM 2240.

24. A tire comprising the vulcanized tire composition of claim 18.

25. A method for producing a tire composition, comprising:
producing a sulfur-functional linear polyorganosiloxane comprising a chemically-protected sulfur group by reacting a linear polyorganosiloxane comprising an alkene group and a —R$^{28}$ group bonded to the linear polyorganosiloxane through a divalent aliphatic radical, a divalent cycloaliphatic radical, or a divalent aromatic radical, d a —R, and a thio acid and having a structure as defined in formula (IV):

$$((R^{27}OC(=O))_t\text{-}(L)_j)_k\text{-}(Q)_z J(=E)SH \quad (IV)$$

wherein R$^{27}$ is an aliphatic radical, a cycloaliphatic radical, or an aromatic radical; L is independently at each occurrence a monovalent group or a polyvalent group that is derived by substitution of a C$_1$-C$_{20}$ aliphatic radical, a C$_3$-C$_{40}$ cycloaliphatic radical, or a C$_3$-C$_{40}$ aromatic radical;

Q is oxygen, sulfur or an NR$^{29}$ group, R$^{29}$ is an aliphatic radical, a cycloaliphatic radical, or an aromatic radical;

J is carbon, sulfur, phosphorus, or a sulfinyl group;

E is oxygen or sulfur;

S comprises one or more sulfur atoms;

R$^{28}$ is a hydroxyl group, an alkoxy group, or an aryloxy group;

"t" is an integer that is equal to 0, 1, 2, 3, 4, or 5; "j" is equal to 0 or 1, "k" is equal to 1 if J is carbon, sulfur or sulfinyl, "k" is 2 if J is phosphorus; and "z" is equal to 0, 1, or 2; and mixing the sulfur-functional linear polyorganosiloxane with an unsaturated elastomer;

wherein the sulfur-functional linear polyorganosiloxane comprises one or more of a thiocarbamate, dithiocarbamate, or a derivative or analog of thiocarbamate or dithiocarbamate.

26. The method as defined in claim 25, further comprising adding a filler.

27. The method as defined in claim 26, wherein the sulfur-functional linear polyorganosiloxane comprises a functional group capable of reacting with the filler surface, and the method further comprising coupling the sulfur-functional linear polyorganosiloxane to the filler surface.

28. The method as defined in claim 25, further comprising adding a curing agent.

29. The method as defined in claim 28, further comprising cross linking the unsaturated elastomer.

30. The method as defined in claim 25, further comprising adding a deblocking agent, wherein the deblocking agent is responsive to activate the chemically-protected sulfur groups.

31. A tire formed from a composition comprising the reaction product of a linear polyorganosiloxane comprising an alkene group and a —R$^{28}$ group bonded to the linear polyorganosiloxane through a divalent aliphatic radical, a divalent cycloaliphatic radical, or a divalent aromatic radical, and a thio acid having a structure defined by formula (IV):

$$((R^{27}OC(=O))_t\text{-}(L)_j)_k\text{-}(Q)_z J(=E)SH \quad (IV)$$

wherein R$^{27}$ is an aliphatic radical, a cycloaliphatic radical, or an aromatic radical; L is independently at each occurrence a monovalent group or a polyvalent group that is derived by substitution of a C$_1$-C$_{20}$ aliphatic radical, a C$_3$-C$_{40}$ cycloaliphatic radical, or a C$_3$-C$_{40}$ aromatic radical;

Q is oxygen, sulfur or an NR$^{29}$ group, R$^{29}$ is an aliphatic radical, a cycloaliphatic radical, or an aromatic radical;

J is carbon, sulfur, phosphorus, or a sulfonyl sulfinyl group;

E is oxygen or sulfur;

S comprises one or more sulfur atoms;

R$^{28}$ is a hydroxyl group, an alkoxy group, or an aryloxy group;

"t" is an integer that is equal to 0, 1, 2, 3, 4, or 5; "j" is equal to 0 or 1, "k" is equal to 1; and "z" is equal to 0, 1, or 2;

wherein the reaction product comprises one or more of a thiocarbamate, dithiocarbamate, or a derivative or analog of thiocarbamate or dithiocarbamate.

32. The tire as defined in claim 31, wherein the reaction product further comprises one or more of a hydroxyl group, a methoxy group, an ethoxy group, an isopropyloxy group, an isobutoxy group, or an acetoxy group.

* * * * *